United States Patent
Bealkowski et al.

(10) Patent No.: US 6,282,596 B1
(45) Date of Patent: Aug. 28, 2001

(54) METHOD AND SYSTEM FOR HOT-PLUGGING A PROCESSOR INTO A DATA PROCESSING SYSTEM

(75) Inventors: Richard Bealkowski, Redmond, WA (US); Patrick Maurice Bland, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/276,061

(22) Filed: Mar. 25, 1999

(51) Int. Cl.$^7$ .............................. G06F 13/00; G06F 3/00; G06F 1/24
(52) U.S. Cl. .............................. 710/103; 710/10; 713/100
(58) Field of Search .................................. 710/101–104, 710/8–13; 713/1, 2, 100

(56) References Cited

U.S. PATENT DOCUMENTS

| | | | |
|---|---|---|---|
| 5,220,211 | 6/1993 | Christopher et al. | 307/443 |
| 5,325,517 | 6/1994 | Baker et al. | 395/575 |
| 5,572,395 | 11/1996 | Rasums et al. | 361/58 |
| 5,583,987 | 12/1996 | Kobayashi et al. | 395/182.11 |
| 5,664,119 | 9/1997 | Jeffries et al. | 395/283 |
| 5,680,288 | 10/1997 | Carey et al. | 361/118 |
| 5,737,513 | 4/1998 | Matsuda et al. | 395/182.09 |
| 5,774,645 | 6/1998 | Beaujard et al. | 395/183.01 |
| 5,793,987 | * 8/1998 | Quackenbush et al. | 710/100 |
| 5,796,937 | 8/1998 | Kizuka | 395/182.11 |
| 5,799,022 | 8/1998 | Williams | 371/136 |
| 5,812,757 | 9/1998 | Okamoto et al. | 395/182.09 |
| 5,834,856 | 11/1998 | Tavallaei et al. | 307/64 |
| 6,148,355 | * 11/2000 | Mahalingam | 710/104 |

OTHER PUBLICATIONS

IBM Technical Disclosure Bulletin, vol. 33, No. 12, May 1991, "Bus Arbiter with Synchronized Reset," pp. 451–453.

IBM Technical Disclosure Bulletin, vol. 36, No. 08, Aug. 1993, "Automatic Upgrade of Customer OP System," pp. 7–8.

IBM Technical Disclosure Bulletin, vol. 37, No. 09, Sep. 1994, "Hardware/Software Interface for Turning On/Off Processors in an Multi–processor Environment," pp. 365–367.

IBM Technical Disclosure Bulletin, vol. 38, No. 12, Dec. 1995, "Selection Mechanism for Active Vs. Backup Processor," pp. 75–78.

* cited by examiner

*Primary Examiner*—Sumati Lefkowitz
(74) *Attorney, Agent, or Firm*—Bracewell & Patterson, LLP (57) ABSTRACT

A method and system for hot-plugging a processor subsystem to a system bus of a data processing system while said data processing system is active, where the system bus comprises multiple positions for supporting hot-pluggable processor subsystems, where each processor subsystem includes a processor and associated voltage regulator module. Power is applied to a processor subsystem in response to an indication that the processor subsystem has been added to the system bus of the data processing system. Initialization routines are performed on the processor within the processor subsystem through a controller which transmits initialization data to the processor independent of the system bus, such that additional processor subsystems are integrated into the data processing system with minimal effect on any existing processors operating on the system bus.

25 Claims, 7 Drawing Sheets

METHOD AND SYSTEM FOR HOT-PLUGGING A PROCESSOR INTO A DATA PROCESSING SYSTEM

BACKGROUND OF THE INVENTION

1. Field of the Invention

The present invention relates in general to an improved data processing system and in particular to an improved method and system for hot-plugging processors in a data processing system. Even more particular, the present invention relates to an improved method and system for adapting a bus system to permit hot-plugging processor adapters in a data processing system.

2. Description of the Related Art

With respect to data processing systems and in particular, personal computers and servers, adapter cards are printed circuit boards that enable the computer to use a peripheral device for which it does not already have the necessary connectors or to permit upgrading of the computer to new or different hardware.

Adapter cards are typically coupled to the remainder of the computer system by the system bus or other adapter buses such as a peripheral component interconnect (PCI) bus. The buses supply power to the adapter cards and send and receive control and data signals to and from the adapter cards from other devices coupled to the system bus and other buses.

In earlier computer systems, all of the adapters had to be connected at the time that the computer was first powered on, in order to properly register (initialize) the devices within the computer's operating system. These devices are checked during the system's power-on self-test (POST), which includes a set of routines stored in the system's read-only memory (ROM) or firmware that test the adapters to see if they are properly connected.

In earlier systems, if an adapter were not present on the bus during the POST, then the adapter would not be recognized if the adapter were later inserted in a slot (while the computer was still running). In addition, the buses make no provision for allowing adapters to be inserted into a powered bus slot. Instead, those systems were required to be "rebooted" in order to be able to communicate with and utilize the later-added devices. "Rebooting" refers to the restarting of a computer system by reloading its most basic program instructions. A system can be rebooted using the software itself (a warm boot) or by actuating the system's hardware, i.e., the reset or power buttons (cold boot). After rebooting, the new adapter can be identified using various known techniques.

Further, the removal of an adapter while power is applied could result in severe degradation to the system in conventional bus systems. In order to remove failed or unneeded adapters, the system must be powered down, the configuration change made, and the system rebooted.

With the advent of "hot-plug" adapters, the configuration of a computer system may be altered without rebooting. Hot-plugging is a feature that allows equipment to be connected to an active device, such as a data processing system, while the device is powered on. Further, hot-plugging preferably provides for equipment to be disconnected from an active device while the device is powered on. In the event of failures, rather than powering down the entire processing system to make replacements, the failed hot-plug adapters are removed and replaced by new hot-plug adapters.

To support hot-plug adapters and others, a data processing system is preferably equipped to handle the addition or removal of adapters without degrading the system. Circuitry is typically implemented which protects the hot-plug adapter from power surges upon installation to a bus. In addition, control logic to handle the addition of a new adapter and integrate the adapter into use by the system is typically provided. Further, the control logic preferably handles the removal of a new adapter and removes the adapter from use by the system.

Much development has been achieved in providing hot-plug adapters for adapter cards such as Personal Computer Memory Card International Association (PCMCIA) cards and others. However, it would be preferable to also provide hot-plug processor adapters which would allow failed processors to be replaced without degrading a system and would allow the addition of processors to a system to improve the data processing ability of the system. The utilization of processor adapters requires a substantial complexity of control in order to maintain the balance of a bus line impedance as will be further described.

Figure 1:
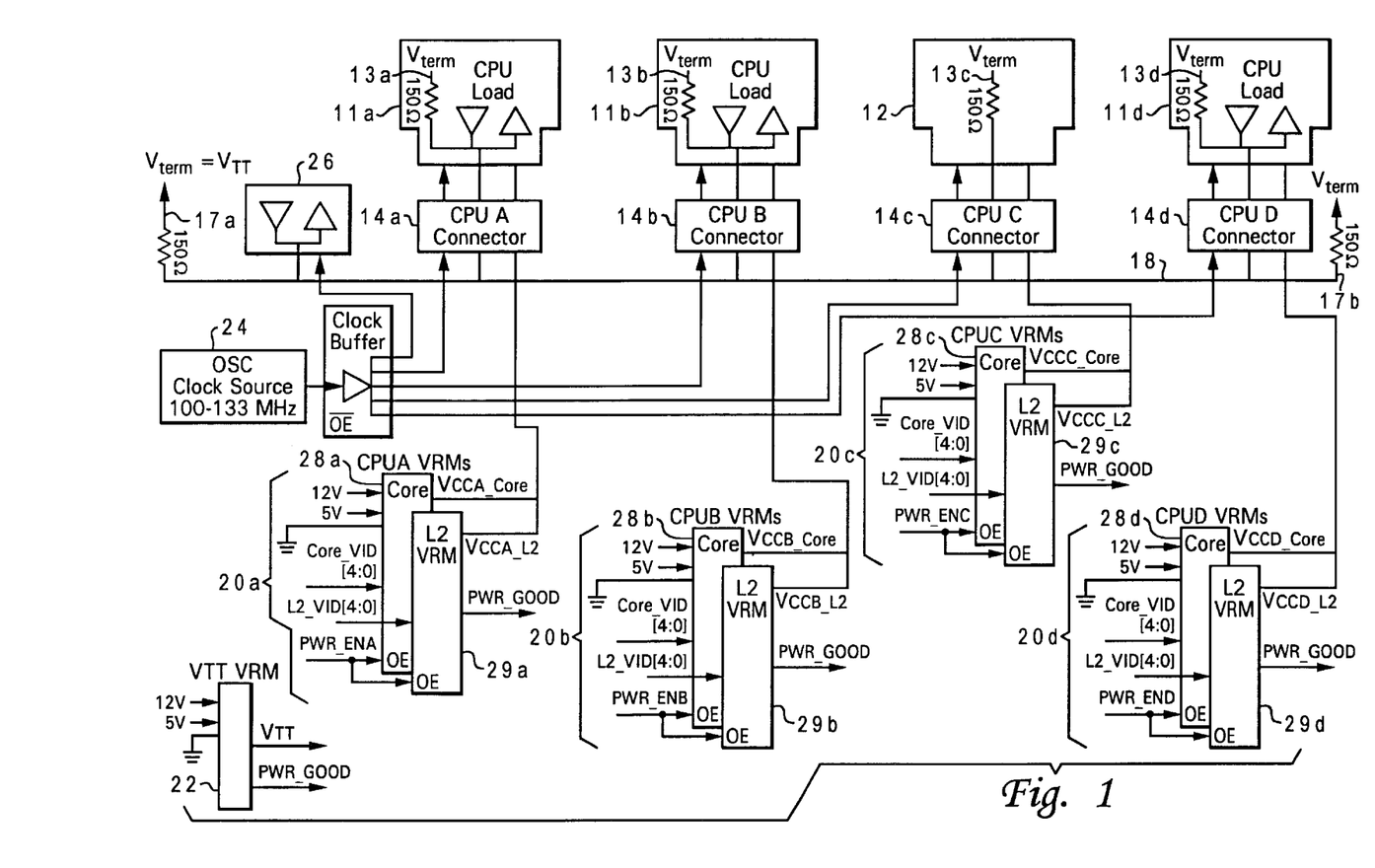
FIG. 1 depicts a schematic diagram of multiple processor cards along a system bus of prior art.

FIG. 1 illustrates a prior art schematic diagram of multiple processor cards 11a–11d along a front-side system bus 18, where each processor card 11a–11d preferably comprises a central processing unit (CPU) load of a processor and associated cache. In particular, the bus architecture depicted is an IA-32 Slot2 GTL+ bus with IA-32 slot2 processor cards as is well known in the art. Each processor card 11a–11d is supplied a clock signal, regulated power supply and bus signal through the associated CPU connector 14a–14d. In the embodiment, a clock source 24 provides a 100–133 MHz clock signal to a core chip set 26 and each of CPU connectors 14a–14d in order to regulate cycles of time for each processor. Core chip set 26 may be a PCI host bridge or other type host bridge.

Each processor card 11a–11d and termination card 12 is provided a regulated power supply Vcc by a corresponding CPU voltage regulator module (VRM) 20a–20d. The combination of a particular processor card of processor cards 11a–11d and associated CPU VRM of CPU VRMs 20a–20d forms a processor subsystem. Since processor cards typically comprise a processor with supporting data cache, each CPU VRM 20a–20d contains a core VRM 28a–28d and a L2 VRM 30a–30d where each core VRM 28a–28d regulates Vcc_Core power to the processor and each L2 VRM 30a–30d regulates Vcc_L2 power to the cache associated therewith.

With reference still to FIG. 1, four CPU connectors 14a–14d are illustrated such that one to four processor cards may be supported on a single front-side bus 18. For the GTL+ bus interface in particular, a 25 ohm transmission line termination impedance must be maintained. In order to maintain the required transmission line termination impedance, there are termination resistors distributed along front-side bus 18 where each termination resistor is supplied a voltage Vtt. In particular, front-side bus 18 is terminated at each end by terminating resistors 17a and 17b. Furthermore, for each processor card 11a–11d or termination card 12 connected to front-side bus 18 through CPU connectors 14a–14d, a pull-up resistor 13a–13d within the processor card is included to balance the impedance across front-side bus 18. Termination card 12 provides load balance to maintain the transmission line impedance.

As described, each CPU connector 14a–14d must be filled by a processor card 11a–11d or terminator card 12 in order to maintain the preferred transmission line termination impedance. The configuration is static and cannot be altered during system operation. For example, in order to replace terminator card 12 with an additional processor, the system must be powered down, terminator card 12 removed, the new processor card inserted and the system repowered. The same process is also utilized if an existing processor card fails in order to replace the failed processor card. Only when the system is rebooted is the new processor card integrated into the data processing system.

In the example of FIG. 1 and in other bus architectures, it would be preferable that the processor cards and/or VRM regulators are hot-pluggable in order that the processor configuration may be reconfigured while power is applied to a personal computer or server. As described above, it is important when making changes to a system bus that the bus impedance is maintained.

SUMMARY OF THE INVENTION

It is therefore one object of the present invention to provide an improved data processing system.

It is therefore another object of the present invention to provide an improved method and system for hot-plugging processors in a data processing system.

It is still another object of the present invention to provide an improved method and system for adapting a bus system to permit hot-plugging adapters in a data processing system.

The foregoing objects are achieved as is now described. A method and system for hot-plugging a processor subsystem to a system bus of a data processing system while said data processing system is active is provided, where the system bus comprises multiple positions for supporting hot-pluggable processor subsystems, where each processor subsystem includes a processor and associated voltage regulator module. Power is applied to a processor subsystem in response to an indication that the processor subsystem has been added to the system bus of the data processing system. Initialization routines are performed on the processor within the processor subsystem through a controller which transmits initialization data to the processor independent of the system bus, such that additional processor subsystems are integrated into the data processing system with minimal effect on any existing processors operating on the system bus.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 2:
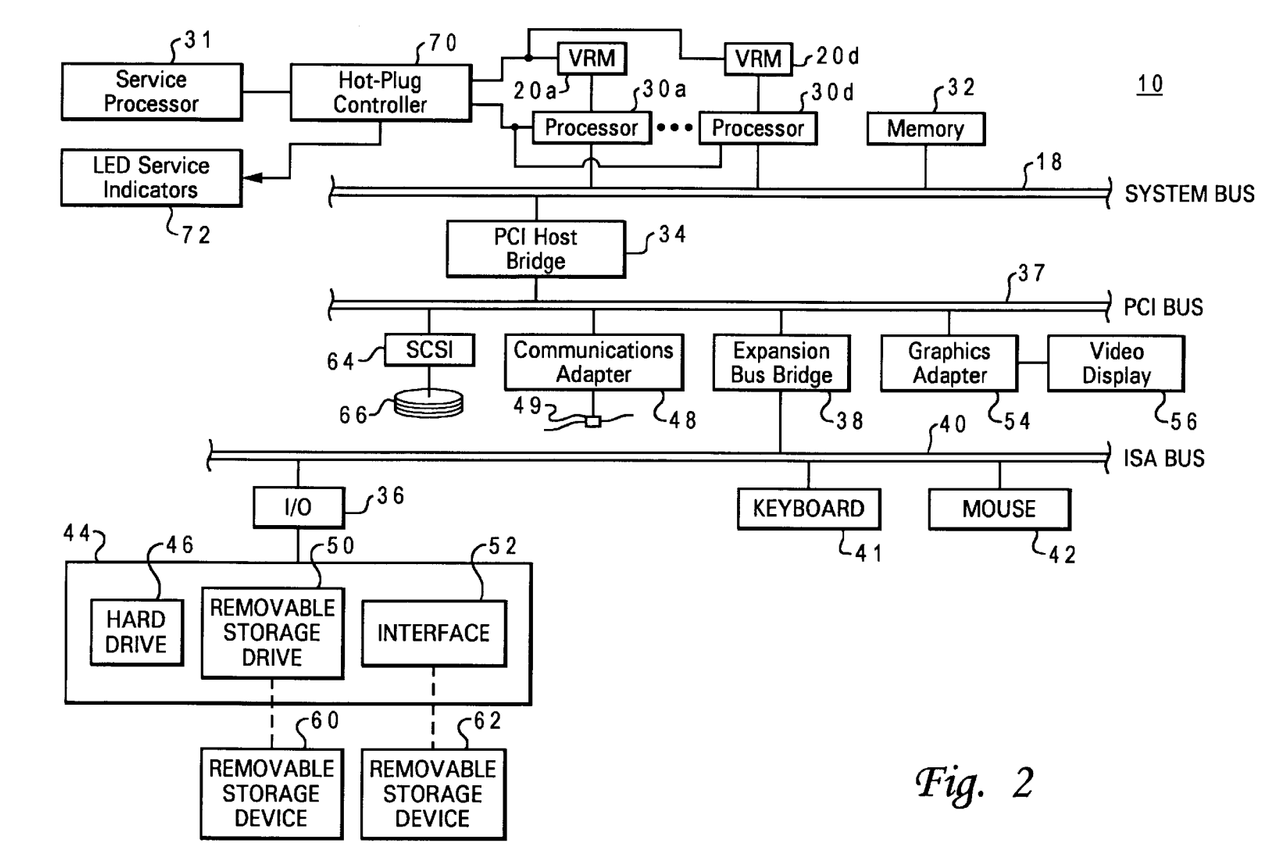
FIG. 2 illustrates a block diagram representation of a data processing system to which a preferred embodiment of the present invention is applicable.

With reference now to the figures and in particular referring now to FIG. 2, there is depicted a block diagram representation of a data processing system to which a preferred embodiment of the present invention is applicable. The environment is a data processing system 10 that includes multiple processors 30a–30d where each processor preferably includes at least one level of cache associated thereto. Preferably, each of processors 30a–30d comprises an adapter with processor circuitry integrated therewith. In addition, preferably, each of processors 30a–30d may be hot-plugged into multiple slots available along system bus 18 and any additional processor supportive buses as will be further depicted and described. Further, after reading the description, it will be apparent to a person skilled in the art how to implement the invention utilizing other data processing systems and/or data processing system architectures.

Each of processors 30a–30d is supplied a regulated power supply from a voltage regulator module (VRM) 20a–20d as will be further described. Each processor 30a–30d and associated VRM 20a–20d will be termed a processor subsystem where preferably both a processor and VRM of a processor subsystem may be hot-plugged into data processing system 10.

Data processing system 10 also includes memory elements 32 connected to system bus 18, which preferably include multiple types of memory including: read-only memory (ROM) and random access memory (RAM). Multiple routines are typically stored in ROM where each routine typically contains multiple processor steps. Each routine may also be represented as a function to be performed on data or an execution step. In addition, within ROM or other firmware, routines which test peripherals to ensure proper operation are included.

Within RAM, an operating system, having application programs incorporated, operates. As will be appreciated by those skilled in the art, memory 32 comprises a number of individual volatile memory modules which store segments of operating system, application software and other data while power is supplied to data processing system 10.

Processors 30a–30d and memory elements 32 are also coupled to a PCI bus 37 of data processing system 10 through a PCI host bridge 34. PCI host bridge 34 provides a low latency path through which processors may directly access PCI devices mapped anywhere within bus memory and or I/O address space. PCI host bridge 34 also provides a high bandwidth path allowing PCI devices to directly access memory elements 32.

Also attached to PCI bus 37 is a small computer system interface (SCSI) controller 64 which is utilized to control a hard drive 66 or other data storage system. Further, a graphics adapter 54 is coupled to PCI bus 37 which controls video display 56 which is preferably a user interface. In addition, a communications adapter 48 may also be attached to PCI bus 37. Communications adapter 48 allows software and data to be transferred between data processing system 10 and external devices via link 49 where link 49 may be an ethernet, token-ring, or other network link. Software and data transferred via communications adapter 48 are in the form of signals that can be electronic, electromagnetic, optical or other signal capable of being received or sent by communications adapter 48 via communications link 49. In particular, communications adapter 48 provides a means by which data processing system 10 may interface with a network such as a local area network (LAN) or the "Internet".

Expansion bus bridge 38, such as a PCI-to-ISA bus bridge may be utilized for coupling Industry Standard Architecture (ISA) bus 40 to PCI bus 37. As illustrated, a keyboard 41, mouse 42 and I/O controller 36 may be attached to ISA bus 40 for performing I/O functions. A secondary memory 44 is coupled to I/O controller 36 where each device within secondary memory 44 is preferably assigned an ID number by which each device may be identified by the operating system. Secondary memory 44 includes, for example, a hard disk drive 46, a removable storage drive 50 and an interface 52. In addition, other devices may also be included as allowed. Removable storage drive 50 may represent a floppy disk drive, magnetic tape drive, an optical disk drive, or other data drive which reads and writes to a removable storage device 60. Removable storage device 60 represents a floppy disk, magnetic tape, optical disk, or any other data storage device which is read by and written to by removable storage drive 50. As will be appreciated by one skilled in the art, removable storage device 60 includes a computer usable storage medium having stored therein computer software and/or data.

In alternative embodiments, secondary memory 44 may include other similar means for allowing computer programs or other instructions to be loaded into data processing system 10. Such means may include, for example, removable storage device 62 and interface 52. Examples may include a program cartridge and cartridge interface, a removable chip (such as electrically erasable programmable read-only memory (EEPROM), programmable read-only memory (PROM) or PCMCIA cards) and associated socket, and other removable storage devices 62 and interfaces 52 which allow software and data to be transferred from removable storage device 62 to data processing system 10.

Hot-plug controller 70 may be controlled by an inter-integrated circuit (I2C) interface. The I2C interface is a common interface utilized with computer systems. The I2C interface typically originates in an I2C controller device such as a service processor 31. Hot-plug controller 70 controls installation and removal of hot-plug adapters through PWR_EN, EN and CFG signals as directed by an I2C signal which controls the power and signal enable/disable and configuration.

In addition, hot-plug controller 70 controls light-emitting diode (LED) service indicators 72. LED service indicators 72 preferably comprises three distinctly colored LED indicators for each processor subsystem. Further, the three lights are preferably green, amber and red. If a processor subsystem is operational, the green indicator light remains illuminated. If a processor subsystem is malfunctioning, the red indicator remains illuminated. If a processor subsystem is enabled for removal or the slot is enabled for adding a subsystem, the amber indicator remains illuminated. In addition, if a user requests that a processor be located, the amber indicator for the processor subsystem may flash.

Service processor 31 typically controls the diagnostic management of data processing system 10. Preferably service processor 31 is an integrated subsystem solution independent of the hardware and operating system, complementing the hardware by monitoring, logging events and reporting on operating conditions within data processing system 10. In addition, service processor 31 preferably includes its own associated memory and controller routines.

The present invention is preferably implemented utilizing software and hardware executing in a data processing system environment similar to that described above with reference to FIG. 2. Thus, the term "computer program product" is used to generally refer to a program stored at secondary memory 44 or hard disk drive 66, however the program may also be stored in other data storage locations of data processing system 10. These computer program products are means for providing software to data processing system 10.

Computer programs or computer control logic are stored in memory 32 and/or secondary memory 44 as operating system and application programs. Computer programs can also be received via communications adapter 48. All such computer programs, when executed, enable data processing system 10 to perform the features of the present invention as discussed herein. Accordingly, such computer programs represent controllers of data processing system 10. Further, computer programs or computer control logic associated with service processor 31 may control the functions of hot-plug controller 70 which controls enablement of hot-plug adapters.

Figure 3A:
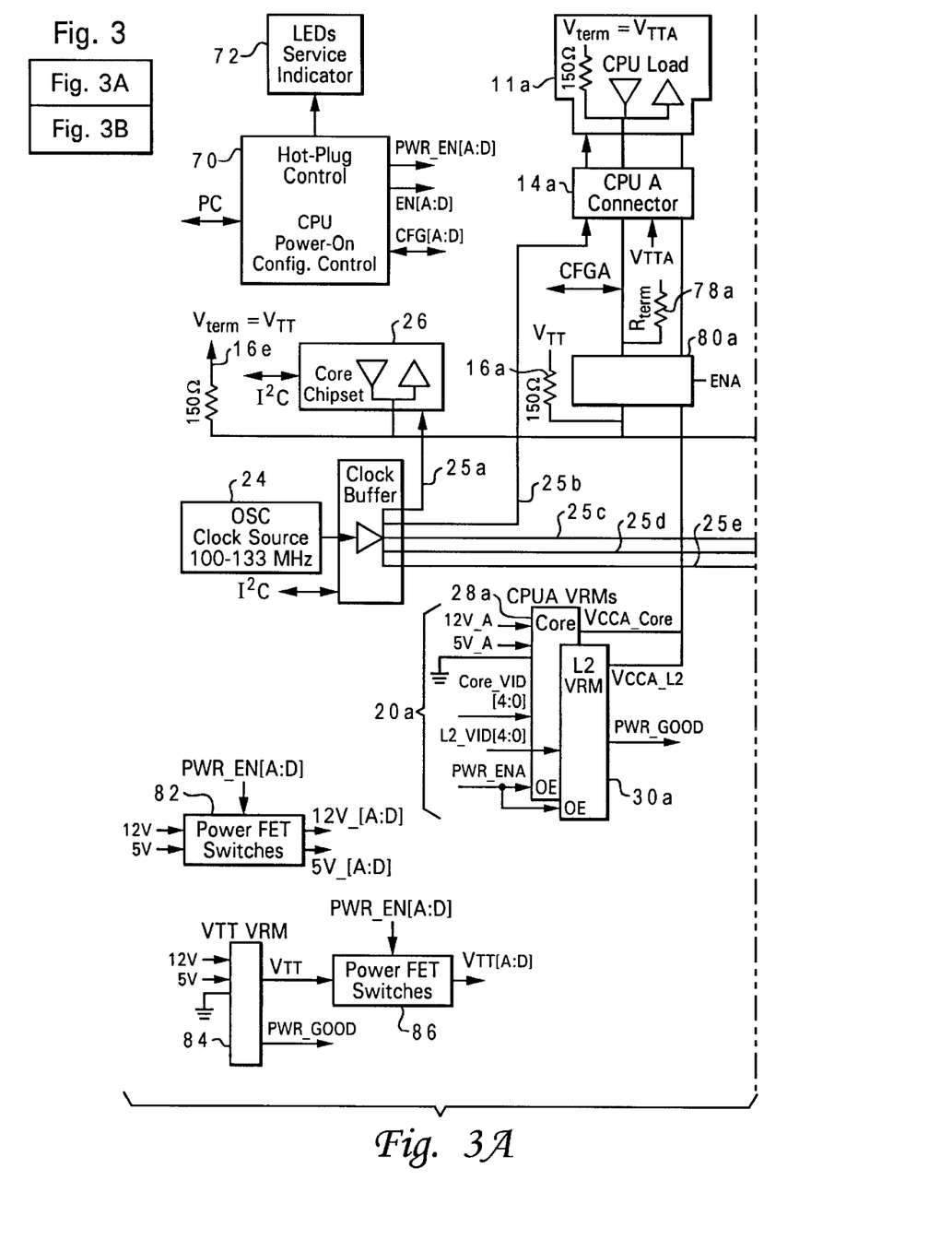
FIG. 3 depicts a schematic diagram representation of a hot-pluggable system bus.
Figure 3B:
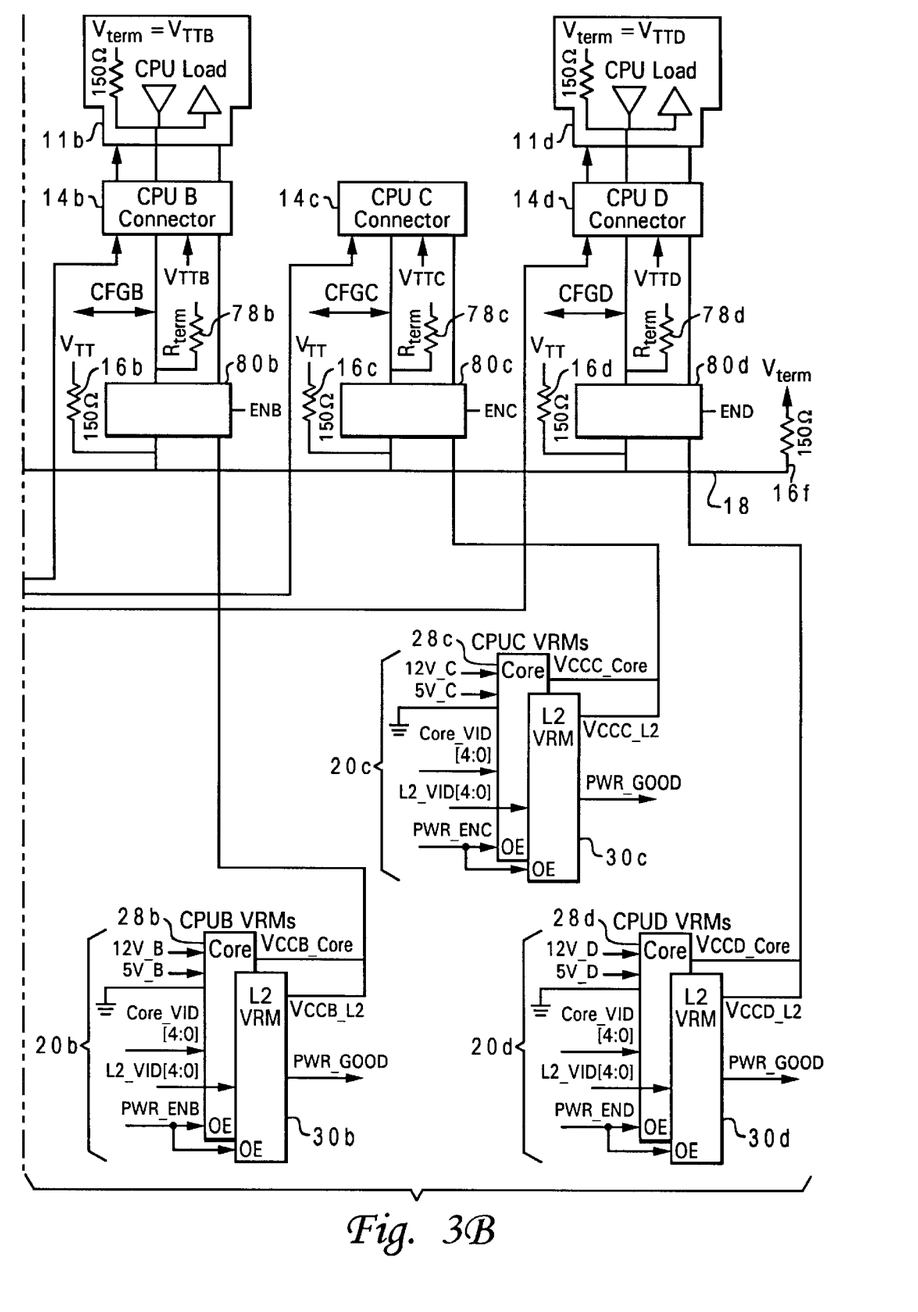

Referring now to FIG. 3, there is illustrated a schematic diagram representation of a hot-pluggable system bus. For the schematic example, the front-side system bus of FIG. 1 has been adapted to provide for hot-plugging processor cards and VRMs. In adapting the front-side system bus to provide for hot-plugging processor cards, it is preferable for the 25 ohm transmission line impedance to be maintained such that the same IA-32 slot 2 processor cards to be hot-plugged without being reconfigured. In addition, the front-side system bus is adapted whereby termination cards are not necessary for empty slots. Thereby, each processor card 11a–11d and CPU VRM 20a–20d may be inserted or removed from data processing system 10 while power is applied thereto. Processor cards 11a–11d may be interfaced with CPU connectors 14a–14d as is well known in the art.

Power is selectively applied to processor subsystems. A VTT VRM 84 supplies a Vtt power supply to a load within each connected processor card 11, as regulated by VTT Power FET switches 86. As controlled by the I2C signal, hot-plug controller 70 provides a PWR_EN signal for each processor card 11a–11d slot which enables VTT Power FET switches 86 to apply power to the associated processor card 11a–11d.

Further, power supply to each CPU VRM 20a–20d is also regulated by hot-plug controller 70 through CPU Power FET switches 82. A 12V and 5V power supply are only applied to a CPU VRM 20a–20d when the associated CPU Power FET switch 82 is enabled by a PWR_EN signal from hot-plug controller 70.

In addition, clock sources are selectively applied to and removed from each processor subsystem. In particular, clock sources 25a–25e are individually applied to and removed from each CPU connector 14a–14d and core chipset 26 via the I2C signal. Enabling of the clock source will occur at the same time or just after the service processor enables the power supply to an associated CPU card through the I2C signal.

Four slots are illustrated for processor subsystems A, B, C and D. For the purposes of example, the addition of processor subsystem A will be described in full, however the description thereof is applicable to any other processor subsystem. A CPU[A] VRM 20a is illustrated utilizing inputs 12V_A, 5V_A, Core_VID[4:0] [A], L2_VID[4:0] [A] and PWR_EN[A]. The Core_VID[4:0] [A] and L2_VID[4:0] [A] signals are voltage identifiers supplied by the processor card 11a containing a value which defines the necessary voltage output to the processor and cache. Inputs 12V_A and 5V_A are only supplied to CPU[A] VRM 20a if PWR_EN[A] is high from hot-plug controller 70. When PWR_EN[A] is high, CPU Power FET switches 82 are enabled to output 12V_A and 5V A to CPU[A] VRM 20. In addition, CPU[A] VRM 20a is enabled to receive inputs when PWR_EN[A] is high. At the same time, when PWR_EN[A] is high, VTT Power FET switches 86 are enabled to output VTT[A]. VTT[A] is supplied to processor card 11a and CPU[A] connector 14a. Thus, after a processor card 11a is added, the PWR_EN[A] signal enables the described power supply to processor card 11a. In addition, clock source 25b is enabled. Furthermore, for any processor card added, the associated PWR_EN[A:D] signals enable the power supply to the associated processor cards. Likewise, for any processor card removed, the PWR_EN[A:D] signals disable the power supply to the associated adapter cards.

After power is properly applied to processor subsystem A and its clock source is stabilized, but before FET switch 80a is enabled, the service processor executes initialization steps on processor card 11a to prepare processor card 11a to be placed on front-side bus 18. In addition, the service processor notifies the operating system (OS) that a hot-plug event has occurred whereby all processor operations are halted. Finally, the service processor issues a soft reset to all the processors along front-side bus 18 and simultaneously enables FET switch 80a whereby all processors are placed into service during the same cycle. By utilizing the hot-plug controller with I2C I/O, initialization functions which would typically require use of front-side bus 18 to perform, are completed independent of front-side bus 18 and any processor subsystems attached thereto.

It is necessary to maintain the power balance across front-side bus 18 during hot-plugging in order to achieve a 25 ohm transmission line termination impedance. Thereby, VTT is applied at each front-side termination resistor 16a–16f where termination resistors 16a–16f are applied at each end of front-side bus 18 and associated with each connector 14a–14d such that when any of FET switches 80a–80d are not enabled, a termination load is provided at each slot, maintaining a 25 ohm transmission line termination impedance. Each FET switch 80a–80d provides front-side isolation of each connector 14a–14d to maintain electrical integrity during hot-plug operation. Preferably, each FET switch 80a–80d matches the electrical, topological, and performance requirements of the slot-2 GTL+ running at 100+ Mhz or in another embodiment matches the particular bus requirements. Termination resistors Rterm 78a–78d, preferably connected on the backside of the connector 14a–14d bus, may range from 30 ohm to 150 ohm to provide an equivalent transmission line impedance of 25 ohm from each FET switch 80a–80d to each connector 14a–14d when power is applied to a processor subsystem. The value of Rterm is layout dependent and determined by electrical simulation of the point-to-point topology of the bus design.

Figure 4A:
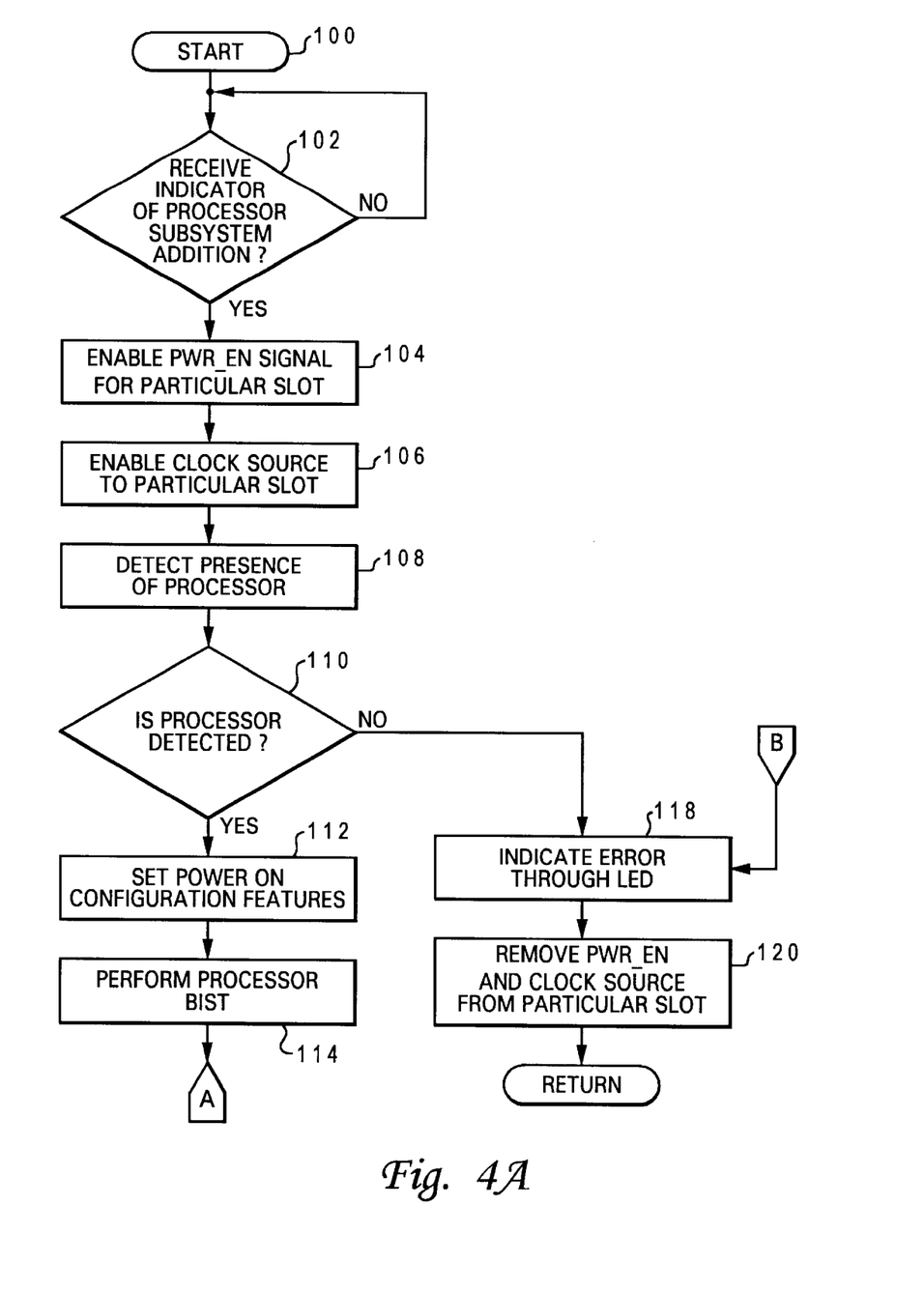
FIG. 4 illustrates a high level logic flowchart of a process for controlling the addition of hot-plug processor adapters.
Figure 4B:
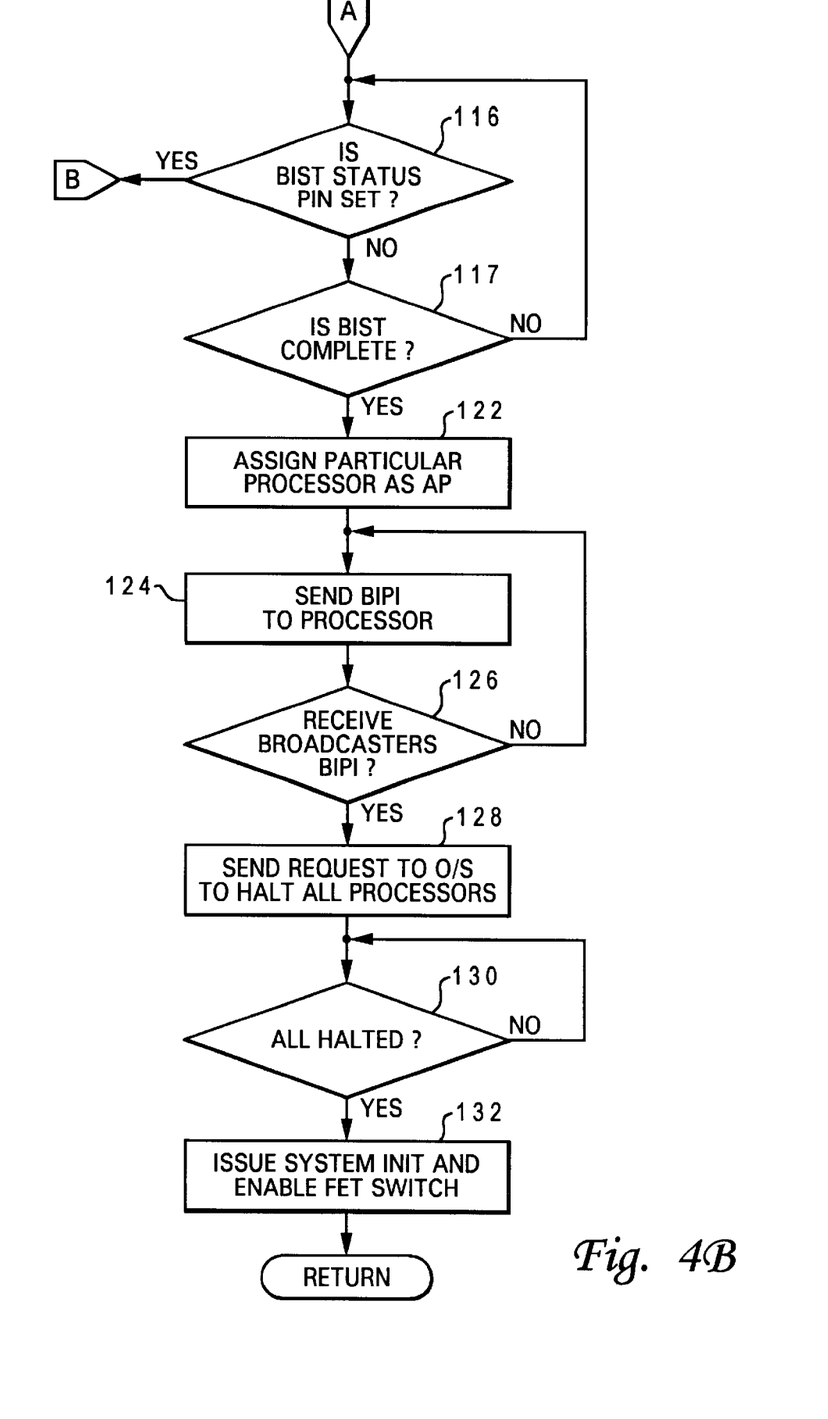

With reference now to FIG. 4, there is illustrated a high level logic flowchart of a process for controlling the addition of hot-plug processor subsystems including a processor card and associated VRM. The process is evoked when a user installs a new processor card and associated VRM. The process starts at block 100 and proceeds to block 102. Block 102 depicts the receipt of an indicator from I2C that a processor subsystem has been installed in a particular slot. In one method, software may be included through which the user indicates that the processor subsystem is installed. In another method, a hardware feature may be provided whereby a user closes a door or flips a switch when a processor subsystem is installed. Other methods of indicating that a processor subsystem has been installed may also be utilized.

Thereafter, block 104 illustrates enabling the PWR_EN signal for the particular slot in which the processor subsystem has been added. Thereafter, block 106 depicts enabling the clock source to the particular slot. Next, block 108 depicts sending a CFG signal to detect the presence of the particular processor subsystem. Block 110 illustrates a determination of whether or not the presence of the particular processor subsystem is detected. If the particular processor subsystem is not detected, the process proceeds to block 118. Block 118 depicts indicating an error through the LED indicators. Thereafter, block 120 illustrates removing the PWR_EN and clock signal for the particular processor subsystem whereafter the process returns. However, if at block 108 the particular processor subsystem is detected, the process passes to block 112.

Block 112 depicts setting the power-on configuration features for the processor card of the particular processor subsystem. These functions are accomplished by the service processor which sends commands to the hot-plug controller through I2C. The hot-plug controller then directly drives a group of processor signal pins through CFG to the processor card and samples the results of the data passing therethrough. Features such as advanced programmable interrupt controller (APIC) identification (ID) selection are executed, where the APIC ID selection defines the APIC cluster group and symmetric multiprocessing (SMP) agent ID which are utilized for front-side bus arbitration. In addition, the processor core clock frequency ratio, processor in-order queue (IOQ) depth, processor observance of various error signals, processor power-on option to run BIST and others are among configurable options needed to be handled by the service processor.

Thereafter, block 114 depicts performing processor BIST for the processor card. Next, block 116 illustrates a determination of whether the BIST status pin is set. Each processor provides a BIST status pin which is sampled by the service processor and thereby can be used to interrupt the service processor if the processor BIST fails. In the case that a processor BIST fails, the BIST status pin is set and the process passes to block 118 which performs the process as previously described.

In the case that processor BIST status pin is not set, the process passes to block 117. Block 117 depicts a determination of whether the BIST is complete. If the BIST is not complete, the process passes to block 116 until a failure or completion. If the BIST is complete, the process passes to block 122. Block 122 illustrates assigning the processor card as an application processor (AP). In particular, the processor of the processor subsystem will attempt to negotiate with any other processors attached to the front-side bus to determine if the processor will be the BootStrap Processor (BSP) or if the processor will be an AP. The BSP is responsible for booting the operating system (O/S) and once the O/S is up and running the BSP functions as an AP. For each reboot of a system, all APs on the front-side bus will remain dormant in a halted state with interrupts disabled until a INIT or start-up inter-processor interrupt (IPI) message is received from the BSP to which the APs respond and are initialized.

Since the processor card is isolated from the other processors in the system due to the associated FET switch being disabled, the hot-plug controller will negotiate with the processor by emulating a processor's local APIC, acting as a BSP, with the goal being to have the added processor become an AP and not a BSP since the O/S is already active and running. The hot-plug controller temporarily assigns the processor a low agent ID or low priority APIC arbitration ID which specifies the processor as an AP.

Thereafter, block 124 depicts sending the first bootstrap inter-processor interrupt (BIPI) message to the processor, causing the processor to clear a BSP bit in the processors's local APIC. Thereafter, the processor is allowed to win the APIC bus arbitration to broadcast its BIPI to the service processor through the hot-plug controller. Block 126 illustrates a determination of whether the service processor receives the broadcasted BIPI. If the broadcasted BIPI is not received, the process passes to block 124 where the BIPI is resent. If the broadcasted BIPI is received, the process passes to block 128.

Next, the service processor will request that the system and all processor subsystems that are attached to the front-side bus be momentarily quiesced so that the FET switch can be enabled when supplied an asserted EN signal to bring it on-line. In making this request, the service processor initiates several control mechanisms. In particular, block 128 depicts sending a request to the O/S to halt all active processors, similar to a system suspend command. Next, block 130 illustrates a determination of whether all active processors are halted. If all active processors are not halted, the process iterates at block 130. If all the active processors are halted, the process passes to block 132. The service processor communicates through the I2C bus with the core chipset to monitor the front-side bus such that the core chipset will notify the service processor when all processor have issued a bus halt transaction and have entered the halt state. Thereafter, block 132 depicts issuing a system INIT#, or soft reset, to all processors attached to the front-side bus and simultaneously enabling the FET switch associated with the particular slot whereby all processors along the front-side bus are placed into a start-up state and allowed to process along the front-side bus during the same cycle. After block 132, the process returns.

Figure 5:
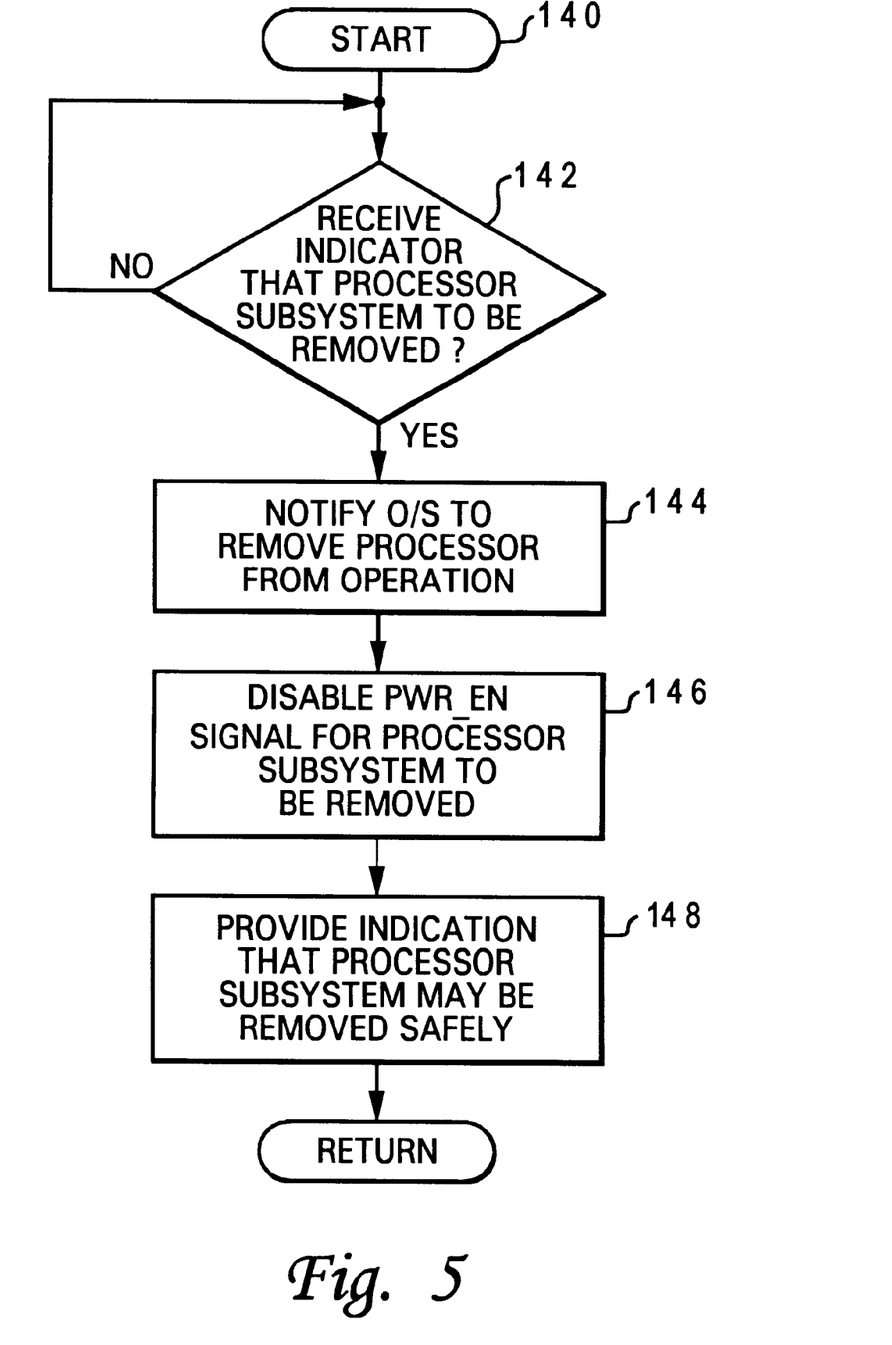
FIG. 5 depicts a high level logic flowchart of a process for controlling the removal of hot-plug processor adapters.

Referring now to FIG. 5, there is illustrated a high level logic flowchart of a process for controlling the removal of hot-plug processor subsystems. As depicted, the process starts at block 140 and proceeds to block 142. Block 142 illustrates receipt of an indicator that a particular processor subsystem is to be removed. In one method, software may be included through which the user indicates that the processor subsystem is to be removed. Thereafter, block 144 depicts notification to the OS to remove the processor of the processor subsystem from operation. In removing the processor from operation, the work load is quiesced from the processor, the caches of the processor are flushed and the processor is set to idle. Next, block 146 illustrates disabling the PWR_EN signal for the particular slot of the processor subsystem to be removed. Finally, block 148 depicts providing an indication to the user that it is safe to remove the processor subsystem. The indicator may be in the form of software, or may utilize the LED lights for the adapter. Thereafter, the process returns.

While there has been described a preferred embodiment of the present invention, variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed is:

1. A method of hot-plugging a processor subsystem to a system bus of a data processing system while power is applied to said data processing system, where said system bus comprises multiple positions for supporting hot-pluggable processor subsystems, where each said processor subsystem comprises a processor and associated voltage regulator module, said method comprising the steps of:

applying power to a processor subsystem, in response to an indication that said processor subsystem has been added to said system bus;

performing initialization routines on a processor within said processor subsystem through a controller which transmits initialization data to said processor independent of said system bus, such that additional processor subsystems are integrated into a data processing system with minimal effect on any existing processors operating on said system bus.

2. The method of hot-plugging a processor subsystem according to claim 1, said method further comprising the step of:

verifying proper installation of said processor subsystem, in response to application of power to said processor subsystem; and removing power from said processor subsystem, in response to improper installation of said processor subsystem.

3. The method of hot-plugging a processor subsystem according to claim 1, said step of applying power to a processor subsystem, in response to an indication that said processor subsystem has been added to said system bus of said data processing system, further comprising the step of:

enabling application of a power supply to a voltage regulator within said processor subsystem, where said voltage regulator regulates the application of said power supply to said processor and to cache associated with said processor.

4. The method of hot-plugging a processor subsystem according to claim 1, said step of applying power to a processor subsystem, in response to an indication that said processor subsystem has been added to said system bus of said data processing system, further comprising the step of:

enabling application of a terminal power supply to a termination bus segment of a connector to which said processor is added, such that a particular bus termination line impedance is maintained along said termination bus segment.

5. The method of hot-plugging a processor subsystem according to claim 1, said step of performing initialization routines on a processor within said processor subsystem through a controller which transmits initialization data to said processor independent of said system bus further comprising the step of:

accessing said processor through a signal at a termination bus segment, where said termination bus segment is connected between said processor and said system bus but isolated from said system bus until enabled by said controller.

6. The method of hot-plugging a processor subsystem according to claim 1, said step of performing initialization routines on a processor within said processor subsystem through a controller which transmits initialization data to said processor independent of said system bus further comprising the step of:

enabling a switch between said processor and said system bus such that said processor is allowed access to said system bus, in response to completion of said initialization of said processor.

7. The method of hot-plugging a processor subsystem to a system bus of a data processing system according to claim 1, said method further comprising the step of:

enabling said processor to process data along said system bus in said data processing system, in response to completion of said initialization of said processor.

8. The method of hot-plugging a processor subsystem to a system bus of a data processing system according to claim 1, said method further comprising the step of:

in response to the receipt of an indication that a particular processor subsystem is to be removed:
notifying said operating system to remove said processor subsystem from operation;
removing power from said processor subsystem;
providing an indication that said processor subsystem is disabled and may be removed from said data processing system, such that a processor subsystem is removed from said system bus without disturbing said termination line impedance.

9. A system for hot-plugging processor subsystems to a system bus of a data processing system, where said processor subsystem comprises a processor and an associated voltage regulator, said system comprising:

means for maintaining a bus termination line impedance along a system bus independent of any hot-plugged processor subsystems;
a hot-plug controller for enabling power to said processor subsystem when said processor subsystem is hot-plugged on said system bus; and
said hot-plug controller for transmitting initialization data to said processor within said processor for initializing said processor independent of said system bus.

10. The system for hot-plugging processor subsystems according to claim 9, said means for maintaining a bus termination line impedance along said system bus independent of any hot-plugged processor subsystems further comprising:

a termination resistor at each end of said system bus and at each processor accepting connector; and
a termination voltage applied at each said termination resistor.

11. The system for hot-plugging processor subsystems according to claim 10, said system further comprising:

a termination bus segment resistor at each termination bus segment; and
said termination voltage applied at each said termination bus segment resistor.

12. The system for hot-plugging processor subsystems according to claim 9, said hot-controller further comprising:

means for verifying proper installation of said processor subsystem; and
means for removing power from said processor subsystem, in response to improper installation of said processor subsystem.

13. The system for hot-plugging processor subsystems according to claim 9, wherein said hot-plug controller enables application of a power supply to a voltage regulator within said processor subsystem, where said voltage regulator regulates the application of said power supply to said processor and to cache associated with said processor.

14. The system for hot-plugging processor subsystems according to claim 9, wherein said hot-plug controller enables application of a terminal power supply to a termination bus segment of a connector to which said processor is added.

15. The system for hot-plugging processor subsystems according to claim 9, wherein said hot-plug controller accesses said processor through a signal at a termination bus segment, where said termination bus segment is connected between said processor and said system bus but isolated from said system bus until enabled by said controller.

16. The system for hot-plugging processor subsystems according to claim 9, said system further comprising:

means for isolating a processor from said system bus; and
said controller for controlling the removal of said means for isolating said processor from said system bus after a hot-plugged processor is initialized through said controller, such that said processor is allowed access to said system bus.

17. The system for hot-plugging processor subsystems according to claim 9, said system further comprising:

means for notifying an operating system to remove a processor subsystem from operation;
said hot-plug controller for disabling power to said processor subsystem;
means for providing an indication that said processor subsystem is disabled and is removable from said data processing system.

18. A program product for controlling configuration changes to a system bus of a data processing system, said program product comprising:

a data processing system usable medium; and
a hot-plug controller encoded with said data processing system usable medium that, in response to a processor subsystem being added to a system bus:
enables the application of power to said processor subsystem; and
transmits initialization data to a processor within said processor subsystem independent of said system bus.

19. The program product for controlling configuration changes to a system bus according to claim 18, wherein said hot-plug controller:

verifies proper installation of said processor subsystem, in response to application of power to said processor subsystem; and
removes power from said processor subsystem, in response to improper installation of said processor subsystem.

20. The program product for controlling configuration changes to a system bus according to claim 18, wherein said hot-plug controller:

enables application of a power supply to a voltage regulator within said processor subsystem, where said voltage regulator regulates the application of said power supply to said processor and to cache associated with said processor.

21. The program product for controlling configuration changes to a system bus according to claim 18, wherein said hot-plug controller:

enables application of a terminal power supply to a termination bus segment of a connector to which said processor is added, such that a particular bus termination line impedance is maintained along said termination bus segment.

22. The program product for controlling configuration changes to a system bus according to claim 18, wherein said hot-plug controller:

accesses said processor through a signal at a termination bus segment, where said termination bus segment is connected between said processor and said system bus but isolated from said system bus until enabled by said controller.

23. The program product for controlling configuration changes to a system bus according to claim 18, wherein said hot-plug controller:

enables a switch between said processor and said system bus such that said processor is allowed access to said system bus, in response to completion of said initialization of said processor.

24. The program product for controlling configuration changes to a system bus according to claim 18, wherein said hot-plug controller:

enables said processor to process data along said system bus in said data processing system, in response to completion of said initialization of said processor.

25. The program product for controlling configuration changes to a system bus according to claim 18, wherein said hot-plug controller:

in response to receipt of an indication that a processor subsystem is to be removed:

notifies an operating system to disable said processor subsystem from operation;

removes power from said processor subsystem; and provides an indication that said processor subsystem is safely removable.

\* \* \* \* \*